(No Model.)

B. J. HEALY.
COMBINED CART AND BUCKBOARD.

No. 371,317. Patented Oct. 11, 1887.

Witnesses.
John C. Perkins.
John H. Chase.

Inventor.
Byron J. Healy
By Lucius C. West
atty.

UNITED STATES PATENT OFFICE.

BYRON J. HEALY, OF KALAMAZOO, MICHIGAN.

COMBINED CART AND BUCKBOARD.

SPECIFICATION forming part of Letters Patent No. 371,317, dated October 11, 1887.

Application filed June 13, 1887. Serial No. 241,113. (No model.)

*To all whom it may concern:*

Be it known that I, BYRON J. HEALY, a citizen of the United States, residing at Kalamazoo, county of Kalamazoo, State of Michigan, have invented a new and useful Combined Two-Wheeled Vehicle and Buckboard, of which the following is a specification.

The object of this invention is to combine a two-wheeled vehicle which is complete in itself with a buckboard delivery-body minus a forward wheeled axle, whereby a four-wheeled vehicle is produced having a delivery-body and a wheeled body and seat independent of said delivery-body and capable of separate use with a horse without changes or the addition of other elements.

Figure 1:
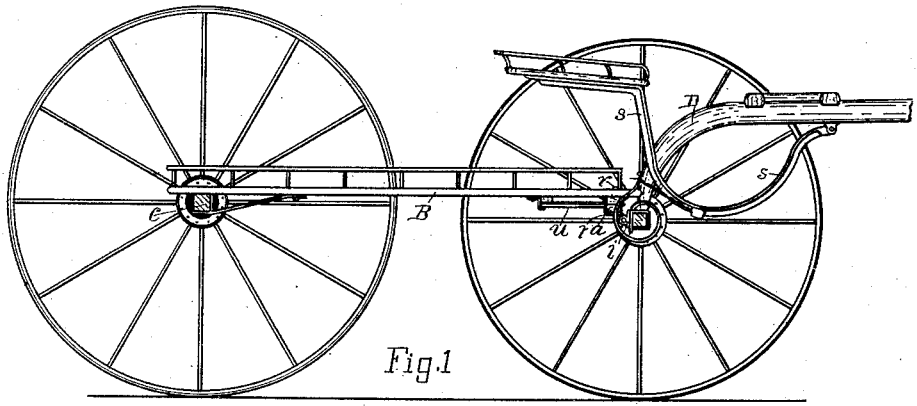
Figure 2:
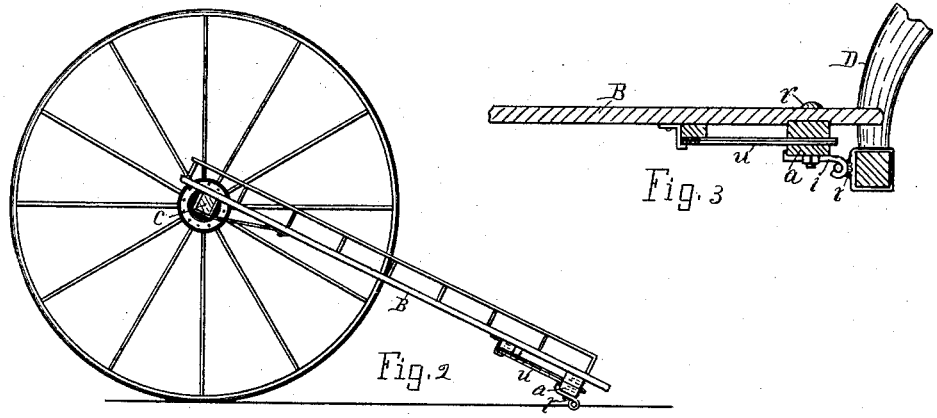
Figure 3:
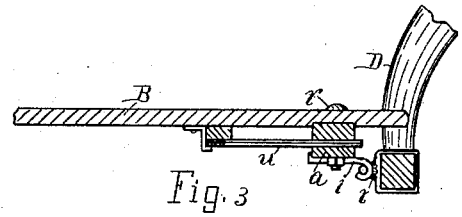
Figure 4:
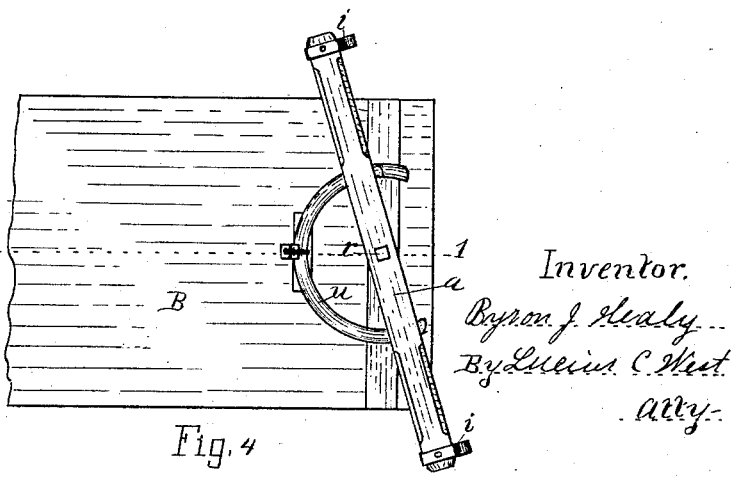

In the drawings forming a part of this specification, Figure 1 is a side elevation; Fig. 2, a lettered part of Fig. 1; Fig. 3, lettered details, parts being in section near the dotted line 1 1 in Fig. 4; and Fig. 4 is an under plan of the forward part of Fig. 2, enlarged.

Referring to the lettered parts of the drawings, D are the thills, and S the body or seat-bars fulcrumed at the forward end to the thills and supported over the axle by elastic supports. This part of the construction, with the axle and wheels, is merely introduced to illustrate a two wheeled vehicle complete in itself.

So far as the present invention is concerned, no stress is placed upon this two-wheeled vehicle *per se*, as any style of road-cart or two-wheeled vehicle complete in itself may be employed.

At B is shown the body of a four-wheeled vehicle similar to those in vehicles known as "buckboards," and having at the rear end a wheeled axle, *c*, but minus a forward running-gear, Fig. 2, but otherwise complete in itself. This construction is, when in use, detachably coupled to and in the rear of the two-wheeled vehicle, Fig. 1.

The purchaser of a construction embodying this invention has a road-cart complete and ready for use at will, and by simply coupling the body having the rear wheels to said road-cart, as above stated, he has a four-wheeled delivery-wagon having greater capacity than ordinarily and with a body and seat for the occupancy of the driver independent of said delivery-body.

The road-cart is complete in itself, and the buckboard or four-wheeled vehicle is only complete when the body having the rear wheeled axle is coupled with it. In Fig. 4, *a* is a bar, which turns on the linchpin *r*, and to which bar one-half of the fifth-wheel *u* is attached. The ends of the bar or bolster *a* are provided with hooks *i*, which detachably couple with loops *t*, attached to the rear side of the axle of the two-wheeled vehicle, Fig. 3.

When the thills are resting on the ground, the parts *i t* can be readily coupled and uncoupled, and when the thills are raised, as when the horse is traveling, they cannot uncouple; but any suitable means may be employed to detachably couple the vehicle parts, and I do not wish to confine my invention to any particular plan.

Having thus described my invention, what I claim is—

1. In combination, an ordinary road-cart or sulky complete in itself, comprising a wheeled axle, thills, and seat-bars supported over the axle and bearing a seat, and a buckboard delivery-body having rear wheels only and detachably coupled at the forward end to said road-cart, the whole constituting a four-wheeled delivery-wagon having a body and seat for the occupancy of the driver independent of the delivery-body, substantially as set forth.

2. In combination, an ordinary road-cart or sulky comprising a wheeled axle, thills, and seat-bar supported over the axle and bearing a seat, a buckboard body having rear wheels only, the bolster centrally pivoted to the forward end of said body, and means for detachably coupling each end of said bolster to the road-cart, substantially as set forth.

In testimony of the foregoing I have hereunto subscribed my name in presence of two witnesses.

BYRON J. HEALY.

Witnesses:
SAMUEL FOLZ,
EDWARD VROEGINDEWEY.